(12) United States Patent
Palermo

(10) Patent No.: US 9,095,131 B2
(45) Date of Patent: Aug. 4, 2015

(54) INSECT REPELLING AND AREA COOLING APPARATUS

(76) Inventor: Joseph Palermo, Hillsdale, NY (US)

( * ) Notice: Subject to any disclaimer, the term of this patent is extended or adjusted under 35 U.S.C. 154(b) by 672 days.

(21) Appl. No.: 13/242,893

(22) Filed: Sep. 23, 2011

(65) Prior Publication Data

US 2013/0075488 A1    Mar. 28, 2013

(51) Int. Cl.
| | | |
|---|---|---|
| *A24F 25/00* | (2006.01) | |
| *A01M 29/06* | (2011.01) | |
| *A01M 29/12* | (2011.01) | |
| *A01M 29/34* | (2011.01) | |
| *A41D 13/00* | (2006.01) | |

(52) U.S. Cl.
CPC ............... *A01M 29/06* (2013.01); *A01M 29/12* (2013.01); *A01M 29/34* (2013.01); *A01M 2200/012* (2013.01); *A41D 13/001* (2013.01)

(58) Field of Classification Search
CPC ............... A61L 9/00; A61L 9/12; A61L 9/04; A61L 2/18; A61L 9/127; A01M 1/2033; A01M 1/2044

USPC ........... 239/34, 47, 49, 50, 58, 59, 53, 54, 55, 239/42, 43
See application file for complete search history.

(56) References Cited

U.S. PATENT DOCUMENTS

| | | | | |
|---|---|---|---|---|
| 1,490,682 | A  * | 4/1924 | Stitt | 239/50 |
| 6,374,044 | B1 * | 4/2002 | Freidel | 392/390 |
| 6,623,352 | B2 | 9/2003 | Illingworth | |
| 6,820,821 | B2 * | 11/2004 | Linstedt et al. | 239/222.11 |
| 6,871,794 | B2 * | 3/2005 | McEwen | 239/44 |
| 6,966,500 | B1 * | 11/2005 | Kelley | 239/60 |
| 7,775,458 | B2 * | 8/2010 | Linstedt et al. | 239/70 |
| 8,096,487 | B2 * | 1/2012 | Hornsby | 239/263.1 |

* cited by examiner

*Primary Examiner* — Davis Hwu
(74) *Attorney, Agent, or Firm* — Leason Ellis LLP

(57) ABSTRACT

The present invention concerns an apparatus for generating a variable or rotating air disturbance with the use of a plurality of filaments controlled by actuators. The filaments are configured to create a movable air disruption that does not require extensive infrastructure to operate and is sufficiently small as to be portable by an individual. The present invention incorporates computer controlled actuators and nozzles to generate programmable air disturbance patterns.

12 Claims, 5 Drawing Sheets

INSECT REPELLING AND AREA COOLING APPARATUS

BACKGROUND OF THE INVENTION

1. Field of the Invention

Figure 1:
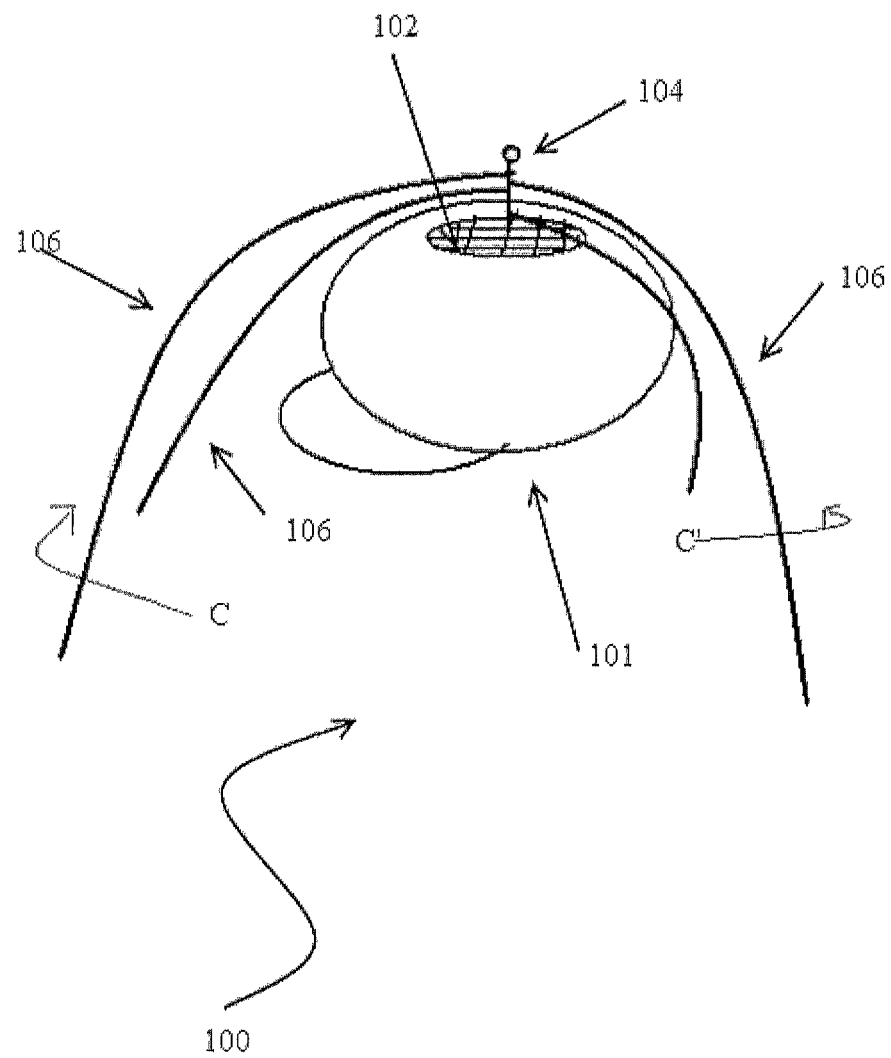

The present invention relates to an apparatus and system for repelling insects and other airborne pests and items from a given area. More particularly, the present invention is directed to disrupting the airflow around a given area to prevent airborne objects from entering that area.

2. Discussion of the Related Art

It is known in the art to use mechanical devices to ward off flying insects. For example, fly swatters are a commonly used mechanical device for warding off or killing insects. As they are commonly understood in the art, fly swatters are formed of a mesh of resilient materials that is affixed to a handle. Upon the action of swatting, the angular momentum of the fly swatter handle imparts speed and force to the mesh, allowing it to strike and kill various sized insects. However, there are obvious drawbacks. Since the fly swatter is operated manually, there is no ability to ward off insects that are present behind a person's back or side. Furthermore, the angular momentum of the fly swatter, while sufficient to kill an insect, is entirely directed to a small surface area. Furthermore, the action of fly swatting requires concentration, and prevents an individual from undertaking on other tasks.

Therefore, what is needed in the art is a device capable of providing a 360 degree area of insect protection around a person or object.

Additionally, it is known in the art to use pressurized air curtains for the warding off of insects. U.S. Pat. No. 6,623,352 herein incorporated by reference, describes the insect control air curtains, sometimes called "Fly Fans" as used in food processing plants Therefore, what is needed is a system for deploying an insect repellant that uses mechanical means to generate a disruption of air currents that prevent flying insects from entering a specific location. Additionally what is needed is a portable apparatus or system that accomplishes these tasks. More specifically, the present invention is directed to a system for mechanically repelling insects by disrupting the flight patterns of pestering insects in a given area.

SUMMARY OF THE INVENTION

The present device is directed to an insect repelling apparatus that mechanically disrupts the flight of insects around a given area. More specifically, the present device is directed to a system for the creation and maintenance of a movable airspace disruption that can be directed at a specific location or is formed in a specified pattern. Furthermore, the present device allows for the 360 degree protection of an individual or area from flying insects. This airspace disruption is designed to confound and confuse flying pests so as to deter them from entering a given area.

In an illustrative embodiment of the device, the airspace disruption generator is placed in conjunction with a power supply at a position that allows said generator to completely protect a person or location. In the illustrative embodiment of the device herein claimed, the airspace disruption generator incorporates the use of a movable armature device to which a filament is secured. The filament is secured optionally to a weight at the end not secured to the movable armature device. Through the action of moving the armature device, the filament is raised or lowered relative to the armature. By rotating the armature device, it is possible to impart rotational motion to the filament and weight. As the filament traces a path during its movement, a vortex resulting from both the filament and its wake prohibits insects from flying closer to the subject.

The device of the illustrated embodiment is portable, such that it can be secured on a hat or helmet. Furthermore, the filament length can be modified during operation so as to generate complex patters to confuse and obfuscate insects so as to prevent them from biting the subject. These complex patterns can be manually generated, or be the result of following a prescribed instruction set stored in the memory of a computer.

In an another aspect of the invention herein described, the device also calls for the optional instillation of a pressurized air curtain generator which provides a movable nozzle and is capable of traveling in an ark of 360 degrees around the base of the device so as to provide additional atmospheric disruption.

In another aspect of the invention, the filament of the device is capable of dispersing fluid so as to cool a given area. Another aspect provides the dispersing of pesticides so as to provide a constant barrier to entry by flying pests.

Another aspect of the present device is to provide portable system capable of deploying insect repellant and other liquids in aerosolized form while performing the primary task.

In yet another aspect, the device is configured to render the entire system portable for use in extreme environments such as jungles, swamps and other insect prone regions. Another aspect of the present device is the ability to restrict the movement of the filament so as to oscillate in front of a predefined area, such as a door or opening to a tent.

BRIEF DESCRIPTION OF THE DRAWINGS

The foregoing and other features of the present invention will be more readily apparent from the following detailed description and drawings of illustrative embodiments of the invention in which list the drawings and their captions.

FIG. 1 is an illustrative side view of an embodiment of the invention.

FIG. 2 is a schematic view of one of the elements of the invention.

FIG. 3 is an illustrative side view of one of the elements of the invention.

FIG. 4 is an illustrative side view of aspects of the present invention.

FIG. 5 is an illustrative perspective view of one embodiment of the present invention.

DETAILED DESCRIPTION OF THE INVENTION

By way of overview and introduction, the present invention concerns an apparatus for generating a variable or rotating air disturbance that confounds the attack and flight patterns of biting insects of insects and other airborne articles from entering a given space. The device is further directed to an air disruption generator that does not require extensive infrastructure to operate, and indeed can be man-portable. Lastly, the present device provides a device capable of generating programmable air disturbances by tracing a weighted filament through the air.

As seen in FIG. 1, the present device 100 possesses a base 102. In the illustrated embodiment, the base is a secured structure that is of sufficient dimensions to prevent the device from tipping over or otherwise becoming unstable. Attached to the base 102 is a movable armature 104. The base 102 provides both structural stability, as well as providing a housing for the internal mechanisms of the device. In the illustrated embodiment, base 102 contains a power supply and a motor or actuators necessary to move the armature. Attached to the armature is a filament 106. The filament 106 is attached at least at one end to a weight 108. In the illustrated embodiment, the device is secured to a piece of headgear 101 that is configured to allow the unobstructed passage of the filament and weight around the circumference thereof. The device is in the present illustration is connected to the head gear 101 by standard fasteners. However, those skilled in the art would appreciate that the device so described is not limited to use with headgear or any other type of apparel.

The filament of the present device is configured as a single strand of lengthened material. For example the filament of the present embodiment can be formed of metal, synthetic, natural, or composite fibers. When a plurality of fibers is used, those fibers have different densities, lengths and material properties from one another. Additionally, those fibers can be made to move in alternating directions C; C. In another embodiment, the end of the filament is configured to provide a plurality of smaller filaments (i.e. horsetail) that enhance the surface area of the end of the filament. Additionally, the weighted element is configured so as to impart sufficient stability to the filament during movement, but not sufficient mass to obstruct the movement of the filament, or prove a hindrance to person either through direct contact or inertia.

The filament also can be hollow or semi hollow to allow the passage of materials from the base to the ends of the filament. The filament is configured to dispense air bursts or forced air through a opening or plurality of openings along the length of the filament. In an embodiment of the device, the filament possesses spaced openings in the body of the filament. Said spaced openings are configured to allow forced or compressed air to be expelled along the length of the filament.

In an alternative embodiment, water can be forced through the filaments and ejected through openings placed in the sides of the filament, that allow for the generation of a specific area of mist. In an alternative embodiment, the filament can be used to disperse smoke or other particulate matter so as to confound or kill insects. Additionally, the present device is configured to distribute viscous liquids such as sun tan lotion. In a further embodiment, the power supply is a wound tension spring that is charged with hand cranking. Upon release, the stored energy in the spring is released overtime and drives the actuators or the filaments directly.

The base 102 in the depicted embodiment is formed as a cylinder or rectangular. However, in alternative embodiments, the base 102 can be any useful shape. In the depicted embodiment, the base 102 is formed of light weight structural materials such as metal, carbon fiber, plastics, synthetic materials or organic materials. Those skilled in the art would easily understand those materials that are suitable for structural elements of the device in general and the support structures specifically.

The exterior of the base 102 also features hooks, fasteners or other points of attachment (not shown) designed to secure the device to buildings, poles, foundations and the like if necessary as opposed to direct attachment the headgear 101. Additionally, in an alternative embodiment, the exterior surface is covered with solar panels for generation of additional energy.

Figure 2:
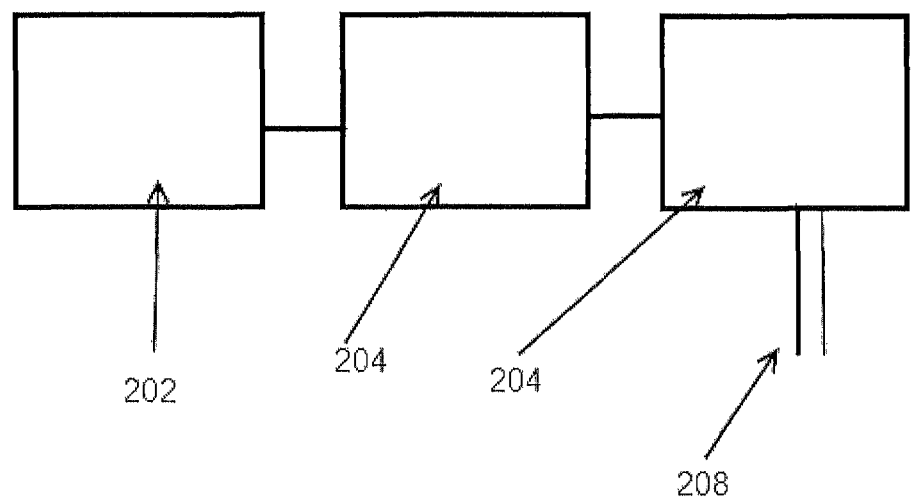

As seen in the schematic of FIG. 2, base 102 includes at least a power supply 202; a control module 204; and at least one actuator or motor 204. The actuator or motor outputs mechanical motion, either linear or rotational, to the armature directly or to a mechanical linkage such as an axel or gear reduced crankshaft 308. The power supply 202 can be an electrical energy storage device, such as dry or wet cell batteries, or fuel cells. In the alternative, the power supply 202 can be a portable petroleum powered generator, depending on the size and portability requirements. For example, a gas generator could be considered when the device is envisioned as a large mobile device. Additionally, power can be supplemented via an electrical outlet socket that accepts standard residential, commercial or vehicular currents and voltages, either directly or through a power adaptor and power converter. Those skilled in the art would recognize the necessary converters and additional modules needed to safely provide this added functionality. Additionally, those skilled in the art can envision additions to, and obvious modifications of, the described modules The control module 204 of the present embodiment is configured as a simple electrical power control system providing variable current or voltage designed to control the speed of motion of the actuator or motor module 206. In an alternative embodiment, the control module 204 is a computer with on-board memory configured to execute a series of instructions. In an alternative embodiment, a control module is equipped with a computer that is programmed to respond to a variety of environmental conditions, such as weather conditions, time and temperature. In still a further embodiment, the computerized module 204 can accept commands via wireless communication protocols from a remote device such as a smart phone or personal computer or other device running an operating system capable of issuing commands.

In an alternative embodiment, the base device 102 can also include a pressurized air generator module (not shown) which is configured as an air compressor. The air compressor is designed to force a volume of air through a connector and separate nozzle 208, thereby increasing the pressure. The present embodiment employs the use of any consumer or professional grade air compressor that is suitable for the given power supply. In the present device, the air compressor is a simple, impeller fan air compressor. In an alternative embodiment, a fan-less system is employed that reduces buffeting, such as those devices employing the Conada effect. This air is directed into one open end of the filament and is dispersed through either the opposite end of the plurality of openings in the body of the filament. In the alternative, a fluid reservoir is connected to the air compressor to function as a pump, to pump fluids, fluidized solids and the like into the one open end of the filament.

Figure 3:
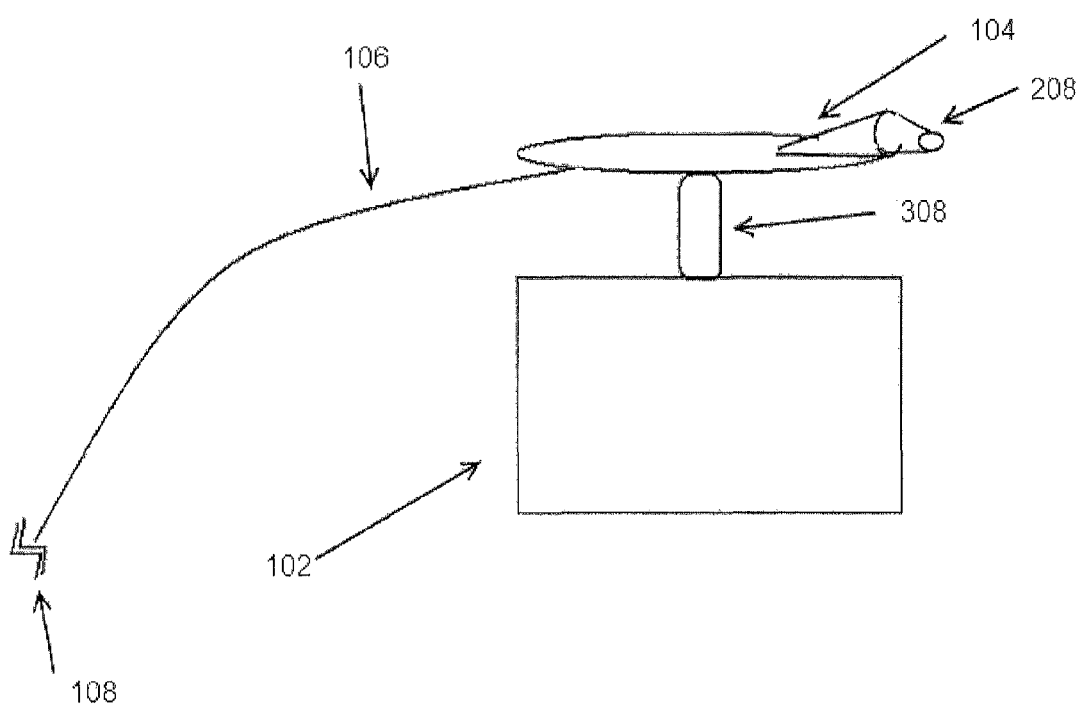

In a particular embodiment of the device, as illustrated in FIG. 3, the axel 308 provides rotational energy to a circular armature 104. This rotation imparts angular momentum to the filament 106 and the associated weight 108. As a result, the position of the weight is correlated to the amount of rotation imparted to the armature 104. In another embodiment, the armature is a gimbaled shaft connected to a plurality of actuators, These actuators are capable of providing increases and decreases in pitch or yaw. As such, the gimbaled shaft is capable of directing the weight to any position in 360 degrees from the axel. As further shown in FIG. 3; the optional air compressor nozzle 208 can be placed co-extensively with the actuator. In that configuration, the nozzle ejects bursts or continuous streams of air so as to supplement the mechanical disturbance of the air surrounding the device. In that particular embodiment compressed air has been directed into the connector that runs through the center of the axel 308, and exits the nozzle 208. In a further particular embodiment, the gimbaled shaft is able to alter the angle of the nozzle relative to the ground so as to provide a movable air curtain. In an alternative mode of operation, the motor or actuators can be replaced with an entire compressed air system. For example, when compressed air is forced though the nozzle, 208, it exerts a counter force in the opposite direction. In another embodiment, this counter force can be designed to rotate or exert pressure on the armature such that 360 degree movements can be achieved. In a further embodiment, secondary actuator controlled baffles can be placed at the end of the nozzle 208 so as to direct the compressed air either higher or lower than the plane of the actuator. In this way, the counter force can be used to apply pitch control to the armature. The compressed air can further be directed to an atomizer (not shown) which contains a reservoir of pesticide or other fluids that can be periodically ejected at high velocity by the nozzle.

Figure 4:
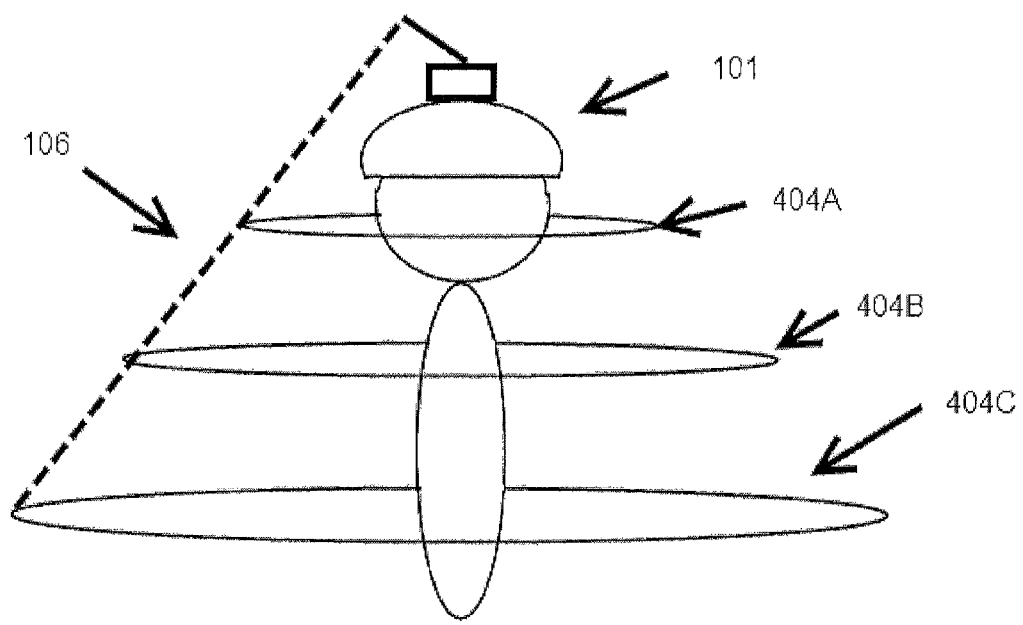

As shown in FIG. 4, the device of the present invention is capable of being rotated 360 degrees around the base. The force generated by the filament 106 is sufficient to disrupt air patterns surrounding the subject. As depicted, the device is secured to a helmet 101. From this position, complete protection can be achieved. In yet a further embodiment of the illustrated device, the filament can be given more or less slack depending the desired protection level. As shown, the circumference of the protection area increases with the length of the filament 404A-C. As such, a users can spool additional filament length from a filament spool (not shown) so as to increase the circumference of the protection zone. Additionally, the user can alter the speed of the movement of the filament so as to produce a greater circumference due to angular momentum. Through these two mechanisms, the control device can be programmed to provide complex patterns of movement through the air. As such, control algorithms are devised to control individual or groupings of filaments for a multitude of purposes. In an alternative embodiment, one grouping of filaments might be directed to warding off a type of "fly" while a second grouping are directed to warding off "misquotes." This is a non-limiting list of insects whose flight patterns can be disrupted. In still another embodiment, different weights 108 are selected for attachment to the filaments that posses varying properties such as aerodynamic properties, lights, chemical coatings and other items useful in the warding off of insects. Furthermore, sensors or other devices can be connected, either physically or wirelessly so as to provide input to the control device.

Figure 5:
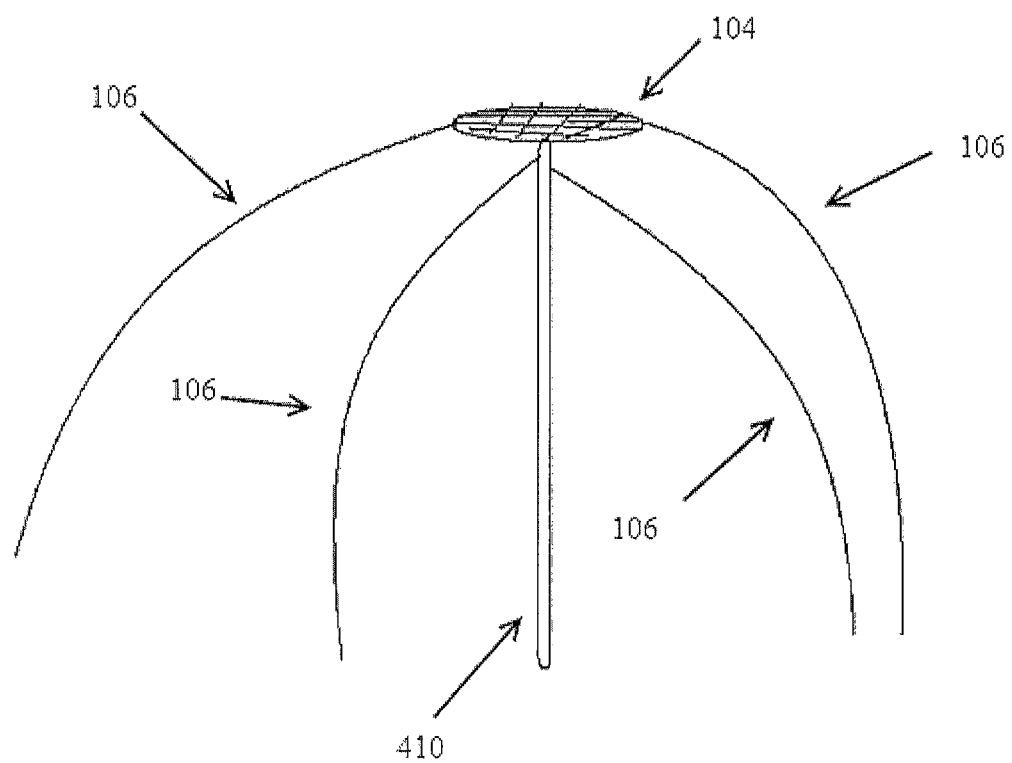

During the operation of the present device, it might be preferable to restrict to movement of the filaments to specific area. As shown in FIG. 5, a particular illustration of the present invention employs the use of a stationary flight path disturbance generated by the device. As depicted, the device is stood upon a pole or other high structure 410. This allows the filaments 106 the be extended to a greater length than when used with the hat secured device. Through the action of the device, the filaments are enabled to move in a clockwise or counter clockwise direction, or trace a particular stored movement pattern. The device illustrated provides a larger area of protection against flying insects that allows a variety of activities to proceed undisturbed. For example, the illustrated embodiment can function as a shelter. In this embodiment, the filaments function to ward off insects so that the users may rest underneath the canopy of the device. In another embodiment, the amount of filaments is sufficient to block a percentage of sunlight falling within the area protected by the filaments. With the addition of sufficient filaments, sunlight is effectively diminished for the device to function as a sun shade, while warding off insects. Additionally, as described previously, water or other liquids can be dispersed from the filaments so as to provide a zone of cooler temperatures. Alternatively, the device of the present invention can be configured to provide protection for rain and other precipitations by functioning as an umbrella.

In a further embodiment, the present device is configured as an arm or waist band. In these situations, it is not necessary for the filaments to be able to rotate in relation to the bases, as sufficient warding is possible merely by actuations of the filament.

It should be understood that various combination, alternatives and modifications of the present invention could be devised by those skilled in the art. The present invention is intended to embrace all such alternatives, modifications and variances that fall within the scope of the appended claims.

While the invention has been particularly shown and described with reference to a preferred embodiment thereof, it will be understood by those skilled in the art that various changes in form and details may be made therein without departing from the spirit and scope of the invention.

What is claimed is:

1. An insect repelling device comprising: a base containing a power supply, and at least one actuator; a filament having a length configured to extend beyond a radius of the base in at least one direction, having a first and a free end, wherein the first end is connected to the actuator; wherein at least one actuator is configured to move the second end of the filament around the base in any direction.

2. The insect repelling device of claim 1, wherein the length between the first and second end of the filament is variable.

3. The insect repelling device of claim 1, wherein the second end of the filament is attached to a weight.

4. The insect repelling device of claim 1, wherein the second end of the filament is further divided in to a plurality of smaller filaments.

5. The insect repelling device of claim 1 wherein the actuator is configured to function as an axel and imparts radial motion to the filament.

6. The insect repelling device of claim 1, wherein the weighted element is removable.

7. The insect repelling device of claim 1, wherein the powered actuators are computer controlled.

8. The insect repelling device of claim 7, wherein the movement of the actuators is controlled via a pre-programmed instruction set stored in the memory of a computer.

9. The insect repelling device of claim 1, wherein the filament is hollow.

10. The insect repelling device of claim 1, wherein air, fluids or fluidized solids are forced out of the second end of the filament in a continuous stream or in discrete bursts.

11. The insect repelling device of claim 10, wherein the fluid is water.

12. A device comprising: a base containing a power supply, and at least one actuator; at least one filament configured to extend beyond the base in at least one direction having a first and second end, wherein the first end is connected to the actuator; wherein at least one actuator is configured to move at least one filament around the base in any direction.

* * * * *